Figure 1:
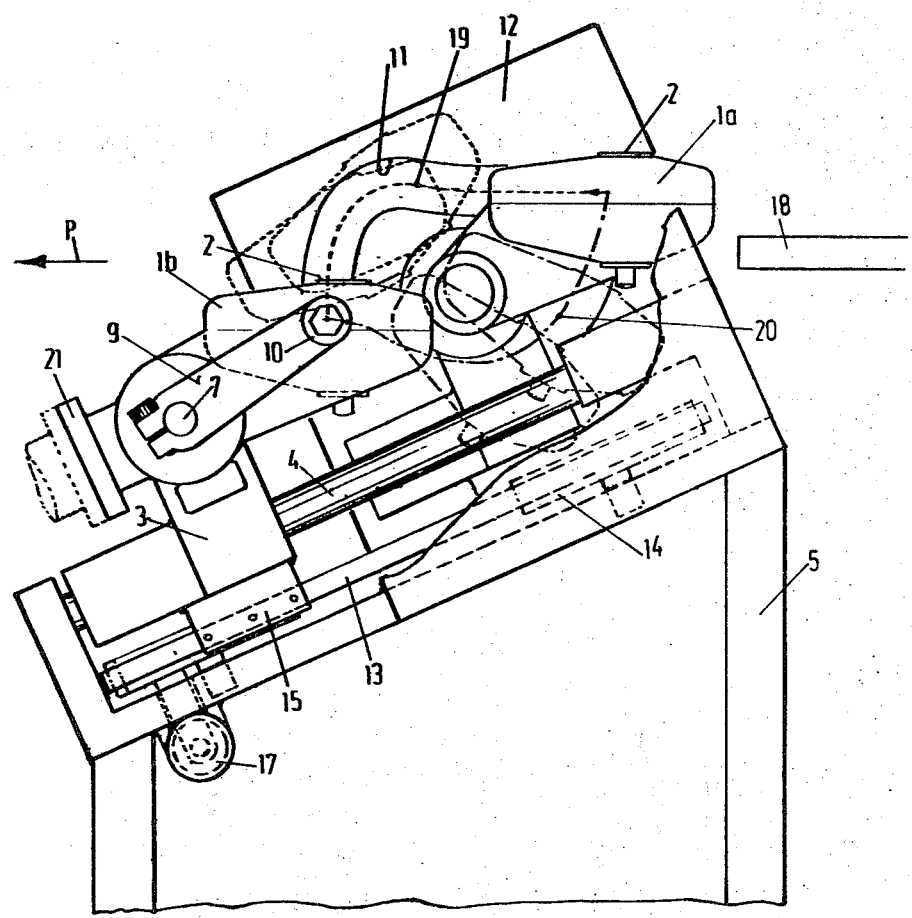

United States Patent [19]
Boogers

[11] 3,838,697
[45] Oct. 1, 1974

[54] DEVICE FOR CUTTING BUNCH LEAVES OR WRAPPERS FOR FILLERS OF CIGARS RESPECTIVELY

[75] Inventor: Wilhelmus P. L. Boogers, Best, Netherlands

[73] Assignee: Arenco-P.M.B.N.V., Best, Netherlands

[22] Filed: Jan. 22, 1973

[21] Appl. No.: 325,736

[30] Foreign Application Priority Data
Jan. 24, 1972 Netherlands...................... 7200930

[52] U.S. Cl.................................... 131/26, 131/58
[51] Int. Cl........................................... A24c 01/14
[58] Field of Search................................ 131/26, 58

[56] References Cited
UNITED STATES PATENTS
654,196   7/1900   Tyberg................................. 131/26
654,200   7/1900   Tyberg................................. 131/26

*Primary Examiner*—Robert W. Michell
*Assistant Examiner*—John F. Pitrelli
*Attorney, Agent, or Firm*—Snyder, Brown and Ramik

[57] ABSTRACT

The invention relates to a feeding device for a wrapping machine for making fillers or cigars comprising at least two cutting beds interchangeable in place and adapted to cut a bunch leaf or wrapper, said beds being alternately displaced from a position for receiving a tobacco leaf to a leaf cutting position following the former in the direction of passage for delivering the bunch leaf or the wrapper to a wrapping mechanism and conversely. The invention has for its object to provide a machine of short dimension in the direction of passage, the operation of which is quieter than that of the existing machines.

11 Claims, 2 Drawing Figures

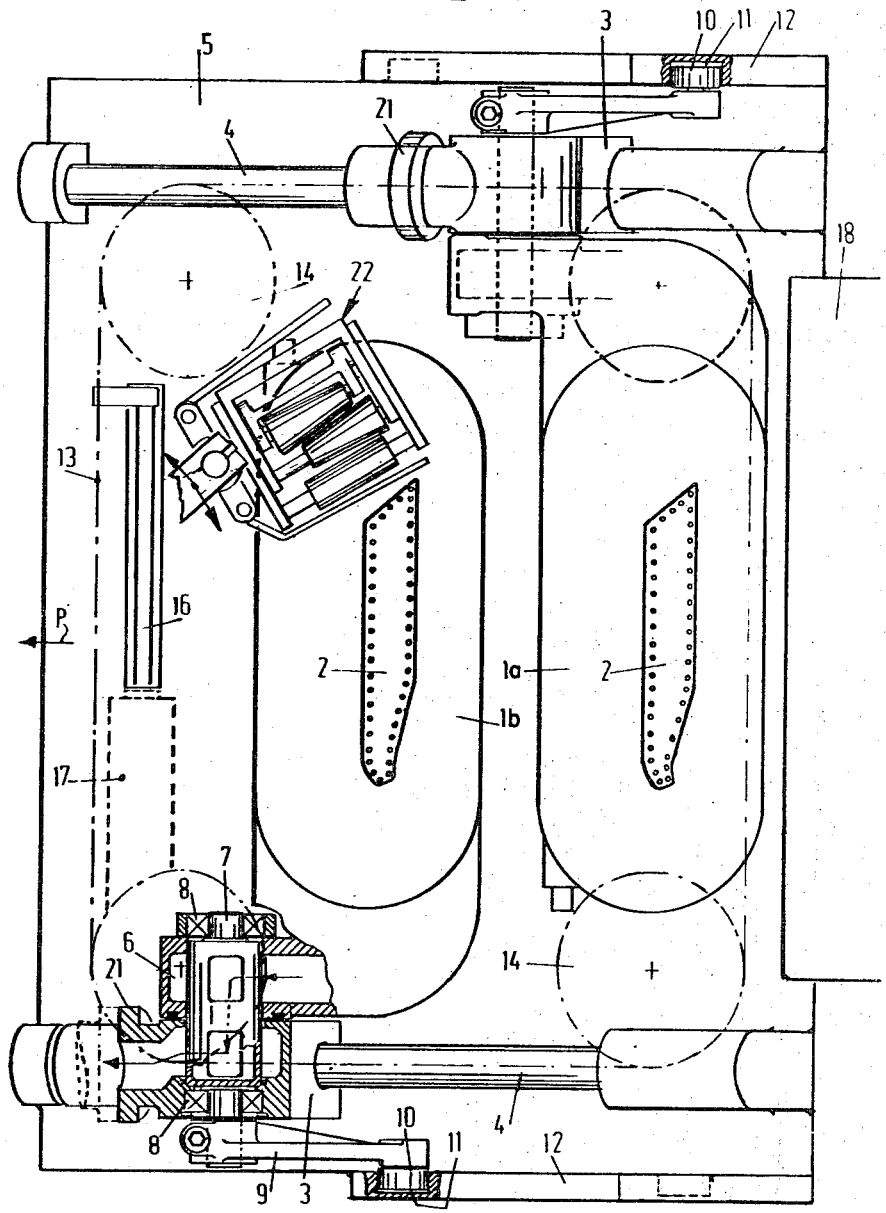

DEVICE FOR CUTTING BUNCH LEAVES OR WRAPPERS FOR FILLERS OF CIGARS RESPECTIVELY

The invention relates to a feeding device for a wrapping machine for making fillers or cigars comprising at least two cutting beds interchangeable in place and adapted to cut a bunch leaf or wrapper, said beds being alternately displaced from a position for receiving a tobacco leaf to a leaf cutting position following the former in the direction of passage for delivering the bunch leaf or the wrapper to a wrapping mechanism and conversely.

Devices of this kind are known, each having a horizontal turntable having a plurality of cutting beds. These turntables have a comparatively large diameter so that the device for making fillers or cigars has a large dimension or depth in the direction of passage.

The invention has for its object to provide a machine of short dimension in the direction of passage, the operation of which is quieter than that of the existing machines. For this purpose in the device embodying the invention the driving mechanism and the paths of the cutting beds are designed so that the two cutting beds located at the receiving and cutting areas respectively are located one after the other with a slight amount of clearance. This small depth of the device has the advantage that the operator can readily reach the cutting bed located in the cutting position without the need for standing up. Moreover, the operator can readily supervise and reach from his seat the further manipulations in the device.

It is advisable for the track followed by the cutting beds to be located in a vertical plane, since the movements then performed by the cutting beds make a quieter impression on the operator than in the case in which the track is lying in a horizontal plane.

In order to obtain a simple driving mechanism it is preferred, in accordance with the invention, to cause the cutting beds to cover the same, closed track, whose portion extending away from the receiving station is substantially horizontal.

In a preferred embodiment of the invention, comprising two cutting beds, each cutting bed is pivotally arranged on a rectilinearly reciprocatory slide, whilst the guide members associated with each cutting bed convey the cutting bed moving away from the receiving station along and above the other cutting bed. Thus, the cutting bed moving towards the receiving station arrives from below to meet the lay-down movement of the operator. Subsequently, the cutting bed provided with a new tobacco leaf moves horizontally to the rear, which ensures a high degree of safety for the operators.

Other aspects of the invention will be set out in the following specification with reference to the Figures illustrating a preferred embodiment of the device in accordance with the invention.

In the drawing;

FIG. 1 is a side elevation, a side plate of the device embodying the invention being partly broken away, FIG. 2 is a plan view of the device illustrated in FIG. 1.

The device shown in the Figures comprises two cutting beds 1a, 1b each having an upright knife 2 having the shape of the bunch leaf wrapper to be cut. Each cutting bed 1a and 1b is pivotally suspended to a slide 3 capable of reciprocating along a guide bar 4. It will be apparent from FIG. 2 that these guide bars 4 are arranged on either side of the cutting beds 1a and 1b and rigidly secured to the frame 5 of the device.

At one of its end each cutting bed is provided with an arm 6, secured to a spindle 7. The spindle 7 is rotatable in bearings 8 of the slide 3. To the end of the spindle 7 facing the cutting bed is clamped an arm 9, the free end of which is provided with a roller 10. The roller 10 fits in a guide groove 11 provided in a guide plate 12, secured to the frame 5 outside the guide bar 4.

Beneath the plane going through the guide bars 4 an endless belt 13 is passed around four end rollers 14. By a correct disposition of these rollers 14 it is ensured that at least two parallel runs of this belt are available beneath the guide bars 4. The slides 3 are secured by suitable connecting members 15 with these two parallel runs so that, when one cutting bed is in the receiving position, that is to say on the right-hand side in FIG. 1, the other is in the cutting position, that is to say, on the left-hand side of FIG. 1. At an appropriate point of the belt the free end of a plunger 16 is secured to this belt 13. It will be obvious that with a reciprocatory movement of the plunger in a cylinder 17 the belt 13 will also perform a reciprocatory movement and carry along the slides 3. The stroke of the slides 3 corresponds, of course, with that of the plunger 16.

Although the rollers co-operating with the knife 2 in the cutting beds 1a, 1b for cutting the bunch leaf or wrapper out of a tobacco leaf lying on a cutting bed, do not fall within the scope of the invention, they are shown schematically in FIG. 2 for the sake of clarity and designated by reference numeral 22.

The device operates as follows.

On the right-hand side of the Figures a table top 18 represents the place of the operators. The operator lays down a tobacco leaf on the cutting bed 1a located near the table 18, after which the plunger 16 moves out of the position shown in FIG. 2 back into the cylinder 17. By the belt transmission 13 the slide 3 lying foremost in FIG. 1 moves to the right, whereas the other moves to the left. During this movement each slide carries along a cutting bed with the arm 9 and a roller 10.

In dependence upon the position of the cutting bed the roller 10 follows the groove 11 of the associated plate 12, that is to say, the roller associated with the cutting bed 1a in the receiving position follows the curve indicated by the broken line 19 in FIG. 1, whereas the roller associated with the cutting bed in the cutting position covers the curve indicated by the dot-and-dash line 20 in FIG. 1. The curves 19, 20 are chosen such that the two cutting beds will not come into contact with each other during passing (see also the intermediate positions indicated by dotted lines in FIG. 1).

After the two cutting beds have interchanged their places, the operator can put down a new tobacco leaf on the cutting bed 1b, which has then arrived at the table 18, whereas on the cutting bed 1a then occupying the cutting position the bunch leaf or wrapper can be cut out. The cut-out bunch leaf or wrapper is then conducted away in the pass direction indicated by the arrow P.

This moving mechanism ensures that the cutting beds cover a closed track. It should be noted that each time the cutting bed moving toward the receiving station arrives from below in front of the table 18 and moves away from this place in a substantially horizontal path. This mode of movements provides a high degree of safety for the operators.

It should finally be noted that each slide 3 is provided with a connecting flange 21 for a suction duct. This suction duct communicates via the hollow slide, the spindle 7 and the hollow arm 6 with the perforated top surface of the cutting bed 1a, 1b.

Within the scope of the invention other driving means may, of course, be employed. For example, a rockable rod may be arranged between the slides and coupled with the slides so that the rocking motion causes the slides to move to and fro. Moreover, it is feasible to use cams and grooved discs compelling the slides to perform reciprocatory and opposite movements.

Finally, it is possible to drive the slides independently from each other, so being able in the same cycle time to lengthen the time necessary for laying down a tobacco leaf on the cutting bed in comparison to the driving system mentioned above: for example to move the slides faster from the receiving position to the cutting position than in the return motion.

What is claimed is:

1. A feeding system for a tobacco wrapping machine having an operator's station and a work station spaced therefrom so as to be accessible to an operator, said feeding system comprising, in combination:

at least a pair of cutting beds each movable between said operator's station and said work station;

guide means for guiding each of said cutting beds in moving between said operator's station and said work station to follow a closed path defined by separate consecutive runs respectively leading from said operator's station to said work station and returning from said work station to said operator's station and said guide means including at least one guide plate having a groove therein defining a closed guide path;

link means interconnecting each cutting bed with said guide means to locate said cutting beds at all times at different, non-interfering points of their respective closed paths and said link means including an arm pivotally connected adjacent one end to one of said cutting beds and interengaged adjacent such one end with said groove in said guide plate; and drive means for moving said cutting beds back and forth between said stations while being guided along said consecutive runs, said drive means including member reciprocable back and forth along a fixed path and connected to said arm adjacent the opposite end thereof.

2. A feeding system as defined in claim 1 wherein said link means locates one bed at the operator's station while the other is at the work station.

3. A feeding system as defined in claim 1 wherein the leading run is above the returning run.

4. A feeding system as defined in claim 2 wherein the leading run is above the returning run.

5. A feeding system as defined in claim 3 wherein said leading run extends substantially horizontally from said operator's station and then drops to said work station.

6. A feeding system as defined in claim 4 wherein said leading run extends substantially horizontally from said operator's station and then drops to said work station.

7. A feeding system as defined in claim 1 wherein said guide means comprises said guide plate located to one side of said cutting beds and a second guide plate located to the other side of said cutting beds, said second guide plate also having a groove therein.

8. A feeding system as defined in claim 7 wherein said link means includes a spindle journalled to said one bed, said arm being fixed at one end of said spindle and a follower member carried by the other end of said arm and engaged in said groove of the first guide plate.

9. A feeding system as defined in claim 8 wherein said member of the drive means comprises a slide journalling said spindle therein, and means for reciprocating said slide back and forth along a rectilinear path.

10. A feeding system as defined in claim 9 wherein said means for reciprocating comprises an endless belt having separate flight portions parallel with the rectilinear paths of the slides, one of said flight portions being connected to said slide, and mechanism for travelling the belt back and forth.

11. A feeding system as defined in claim 1 wherein the closed path which each cutting bed follows is non-circular, said consecutive runs being shaped to place said operator's station and said work station in close proximity to each other.

* * * * *